United States Patent [19]

Davis et al.

[11] 4,356,755

[45] Nov. 2, 1982

[54] ORGAN STOP CONTROL PANEL

[75] Inventors: Lanny C. Davis, Buffalo Grove; Roy A. Anderson, Palatine, both of Ill.

[73] Assignee: CBS Inc., New York, N.Y.

[21] Appl. No.: 111,405

[22] Filed: Jan. 11, 1980

[51] Int. Cl.[3] .......................... G09B 15/02; G10B 3/10

[52] U.S. Cl. .......................................... 84/343; 84/369; 84/477 R

[58] Field of Search .................. 84/337, 341, 343-345, 84/369-371, 464 A, 477 R

[56] References Cited

U.S. PATENT DOCUMENTS 4,023,457 5/1977 Kirkwood et al. ............... 84/343 X 4,157,051 6/1979 Peterson et al. ....................... 84/343

*Primary Examiner*—S. J. Witkowski

*Attorney, Agent, or Firm*—Spencer E. Olson

[57] ABSTRACT

A stop control panel for an organ includes an elongated support panel on which modular groups of touch sensitive switches are disposed in pairs with an indicating lamp disposed between the switches of each pair, wherein the switches of the pair respectively actuate and de-actuate a given stop while the lamp indicates whether the stop is actuated. The touch sensitive switches are overlaid with a front surface layer through which the switches are operable by touch of the layer and through which the indicating lamps are observable when energized. The surface layer has printed thereon a plurality of color-contrasting outlines, each positioned to circumscribe a different pair of switches and associated indicating lamp to facilitate stop selection, the surface layer otherwise having a "dead front" appearance.

19 Claims, 6 Drawing Figures

ORGAN STOP CONTROL PANEL

BACKGROUND OF THE INVENTION

This invention relates generally to organ systems and, more particularly, to a stop switching system for an organ which is compact and inexpensive and which provides visual indication of the stops being played.

Usually the stops of an organ are operated by a plurality of stop tablets or draw knobs which are moved from one physical position to another to obtain a particular stop selection. The operational condition of the stops can be determined by observing the location of the tablets or draw knobs. This arrangement, while having the advantage of traditional appearance, is nonetheless somewhat bulky, expensive and cumbersome in operation.

A stop tablet control system that does not rely on the physical location of the tablets for indication of stop selection is disclosed in U.S. Pat. No. 4,157,051, wherein a multiplicity of stop tablets are pivotally supported on a tablet rail and spring biased to assume a neutral position from which they can be momentarily moved up or down against the action of the spring, and an electrical latching circuit adapted to be latched into one or the other of two stable states by a pulse produced upon momentary movement of the stop tablet. When a tablet is momentarily pushed downwardly from the neutral position the circuit is latched into a first state in which the associated stop is turned "on" and a light-emitting diode mounted on the operated stop tablet is energized, and when the tablet is moved upwardly from the neutral position the associated stop is turned "off" and the light-emitting diode is extinguished. Thus, the operational condition of the stops can be determined by observing which tablets are illuminated. This arrangement, while preserving the traditional appearance and conventional operation of organ stop switching systems, still requires the use of bulky and relatively expensive individual stop tablets.

Commonly assigned U.S. Pat. No. 4,023,457, the disclosure of which is hereby incorporated herein by reference, describes a stop control system for an organ which instead of using tablets or draw knobs, employs a plurality of touch-sensitive switches for operating a plurality of associated latching circuits. The switches are included in a panel adapted for mounting on the organ console, and are disposed in groups associated with given organ manuals or functions. Within the groups, the switches are disposed in pairs connected respectively for setting and resetting the corresponding latching circuit which operates a designated organ stop, and controls an indicating lamp disposed in proximity to the pair of touch-sensitive switches employed for operating the latching circuit, thereby indicating to the organist the condition of the particular stop. This arrangement, while permitting accommodation of a greater number of stops on a given organ console that when tablets or draw knobs are employed, does not have the appearance of traditional stop tablet controls, and the action taken by the organist in effecting stop selection is quite different, and requires greater deliberation, than when playing conventional organs.

It is a primary object of the present invention to provide an organ stop switching system which is compact, is inexpensive, and easy to manufacture, is readily accommodated to use with organ systems of different complexities, and which largely preserves the appearance and stop selection action of traditional stop tablet control systems.

SUMMARY OF THE INVENTION

According to the present invention, a stop control system for an organ includes a plurality of latching circuits associated respectively with individual organ stops and adapted to energize circuitry for effecting selection of an associated stop. A plurality of touch-sensitive switches for operating the latching circuits are supported on a panel adapted for mounting on the organ console, the switches being disposed in groups associated with given organ manuals or effects. Within the groups, the switches are disposed in pairs connected respectively for setting and resetting the corresponding latching circuit which operates a designated organ stop. The switches are overlaid with a common surface layer which provides a substantially flat overall front surface for the panel through which the switches are operable by touch of the layer. The surface layer is essentially opaque to ambient light and has printed thereon a plurality of outlines, each positioned to circumscribe a different pair of the touch-sensitive switches. Indicating lamps, preferably light-emitting diodes, responsive to respective states of each of said latching circuits, are supported in the panel, one within each of the outlines and between the pair of switches employed for operating the given latching circuit, thereby indicating to the organist the condition of the particular stop. The light-emitting diodes are disposed behind the substantially opaque front graphics panel and are visible only when the associated stop is selected.

The supporting panel, and the touch-sensitive switches, are of modular design to provide a high degree of universality; that is, the supporting panel is constructed to receive, at selectable locations thereon, a number of switch assemblies sufficient to control the stops of a given organ, the number of which will vary within the sophistication of the organ, so that only the graphics on the front panel need be changed to accommodate the control panel to organs having different functions. Thus, the panel can be used, with modification of only the graphics panel, on several different organ models, thereby to realize economy of scale on common parts and attendant reduction in manufacturing cost.

BRIEF DESCRIPTION OF THE DRAWINGS

Other objects and features of the invention will become apparent, and its construction and operation better understood, by reference to the following description taken in conjunction with the accompanying drawings wherein like reference characters refer to like elements, and in which.

DESCRIPTION OF A PREFERRED EMBODIMENT

Figure 3:
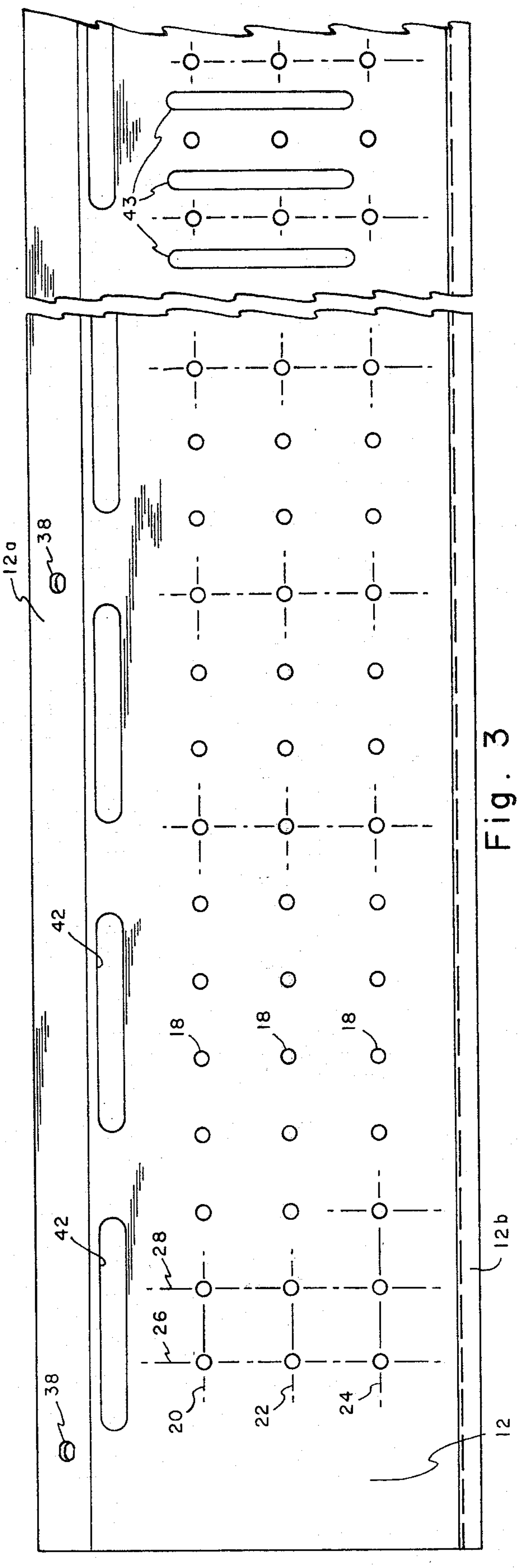
FIG. 3 is a plan view of a portion of the panel support structure.
Figure 2:
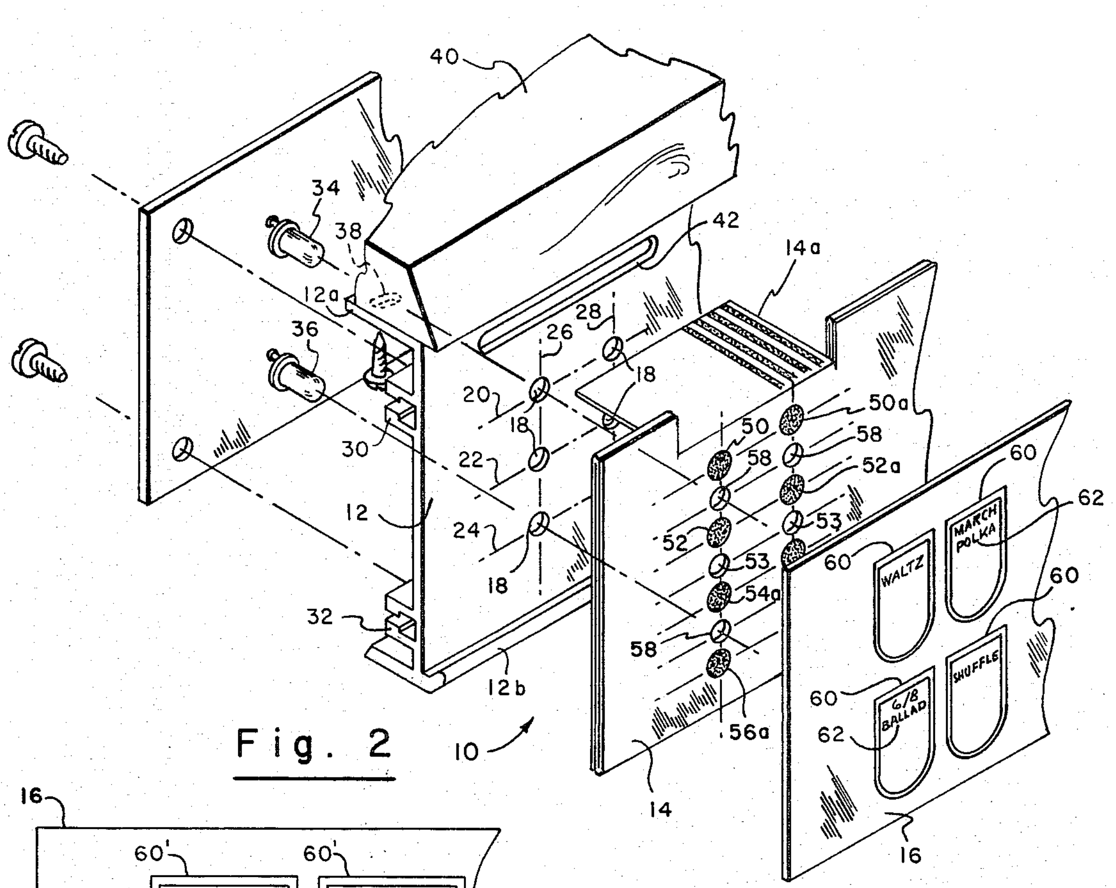
FIG. 2 is an exploded fragmentary perspective view of the FIG. 1 panel, illustrating mounting structure and assembly of the panel.

Referring to the drawings, a flat panel 10 is adapted for mounting on the upper portion of an organ console, above the organ keyboard or manuals. As best seen in FIG. 2, the panel is of sandwiched construction, consisting of an elongated flat supporting panel 12, preferably in the form of an aluminum extrusion, a plurality of membranetype touch-sensitive switches 14, and a front surface layer 16. Panel 12, fragmentary portions of which are shown in FIG. 3, has a multiplicity of apertures 18 therethrough arranged in three vertically spaced horizontal rows 20, 22, and 24 and a plurality of horizontally spaced vertical columns 26 and 28, it being understood that the pattern fragmentarily shown in FIG. 2 is continuously repeated, as shown in FIG. 3, throughout substantially length of the panel. Typically, the spacing between rows is 1" and the spacing between columns is ¾". The extrusion has a pair of integral vertically spaced parallel extending bosses 30 and 32 on the back face to which a circuit board 33 containing latching circuitry, schematically illustrated by block 35, for operating the organ stops and controlling energization of indicating lamps, is attached by a plurality of self-tapping screws. The indicating lamps, preferably light-emitting diodes, two of which are shown at 34 and 36, extend through apertures in the board 33 and are electrically connected to the latching circuitry. Typically, the width of the front face of the supporting panel, between an angularly displaced upper surface 12*a* and a bottom lip 12*b*, is approximately 3¾". A plurality of holes 38 are distributed along the edge of surface 12*a* for receiving screws for attaching the panel to the console, a fragmentary portion 40 of which is shown in FIG. 2. Near its upper edge the panel has a plurality of elongated narrow slots 42 therethrough distributed along the length of the panel, each being generally centered above four adjacent columns of apertures 18. The slots 42 each receive therethrough an integral tab 14*a* of a membrane switch assembly 14, the tab having conductive paths for completing circuits between pairs of contacts of a plurality of switches contained within the switch assembly and respective latching circuits contained on printed wiring board 33 secured to the back of panel 12. At a suitable location along its length, typically near one end, panel 12 may have a plurality of vertically oriented slots 43 therethrough, three of which are shown, dimensioned to receive therethrough slide controls for adjusting rhythm tempo, rhythm level, accompaniment level and the like. The slots are positioned between and equidistant from adjacent columns of apertures 18 and may be utilized or not as the features and functions of a particular organ model may dictate.

Membrane switch 14 includes first switches 50 arranged in a first horizontal row and a second plurality of switches 52 disposed therebelow in a second horizontal row, with the corresponding switches in the rows, say switches 50*a* and 52*a*, being arranged in vertical columns. The adjacent switches from each column form a pair, for example, switches 50*a* and 52*a*, for controlling the "on" and "off" condition of a given organ stop. Although not shown in FIG. 2, a membrane switch assembly, or module, includes four such pairs of switches uniformly distributed along the first and second horizontal rows, and four additional such pairs of switches, one of which comprises the pair 54*a* and 56*a*, arranged in third and fourth horizontal rows disposed below and spaced from the rows containing switches 50 and 52. In between and in vertical alignment with the switches constituting each pair is an aperture 58 which, in turn, is in register with an aperture 18 in support panel 12, in which indicator lamps supported on circuit board 33 are received to inform the observer whether a particular organ stop is actuated. For instance, indicator lamp 34, the tip of which is essentially flush with the front surface of the membrane switch in the assembled panel, will, if illuminated, indicate that the particular organ stop controlled by switches 50 and 52 is in an "on" or actuated condition. It will be evident that the modularly designed membrane switch has, in the described example, eight pairs of switches, each of which pairs having an aperture 58 for receiving an indicator lamp. The switches 50, 50*a*, 52, 52*a*, 54*a* and 56*a* are suitably touchsensitive momentary contact switches provided with a front deformable plastic membrane having a conductive pattern on the rear surface thereof, which pattern completes a circuit between adjacent, spaced contacts thereunder, when the membrane is depressed. Suitable switches are manufactured by Centralab Electronics, Milwaukee, Wisconsin, and by other manufacturers including Molex, Downers Grove, Illinois. Although pressure sensitive switches of this type are preferred, capacitive switches or switches wherein the human body completes a circuit between printed conductive patterns may alternatively be employed.

Figure 1:
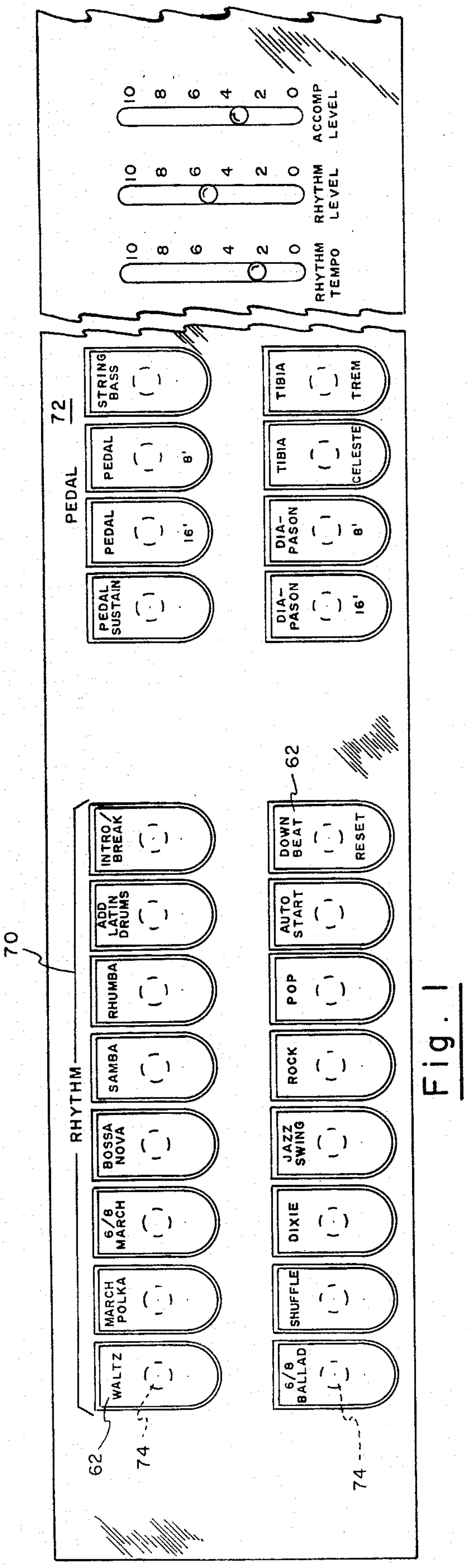
FIG. 1 is a plan view of a portion of an organ stop switching system panel according to the present invention.

The front surface layer 16 has length and width dimensions corresponding to those of the flat front surface of panel 12 and preferably consists of a thin sheet of polycarbonate material, such as "Lexan", having a matte front surface and to the back surface of which paint of various colors is applied to provide the graphics illustrated in FIG. 1. Desirably, the completed panel has a "dead front" appearance, either black or dark brown in color; for purposes of illustration the steps involved in the fabrication of a black panel will be described. Initially, an essentially transluscent grey paint is applied to the back surface of layer 16, over which paint of other colors is applied, by a screening or lithographic process, to define a plurality of outlines 60 (FIG. 1) each of a shape generally corresponding to the shape of a conventional stop tablet; that is, each outline is generally rectangular with one end squared off and the other end rounded and having its longer dimension vertically directed. For a control panel having the illustrated two horizontal rows of "tabs", each outline typically is 1¼ inch long and the outline has a width of 0.050 inch. The stop tab-representing outlines are arranged in horizontal rows and vertical columns to be in registration with respective pairs of touch-sensitive switches contained in switch assembly 14. For instance, the leftmost outline 60 in the upper row is centered around switches 50 and 52 such that the associated indicator lamp 34 extending through aperture 58 is disposed substantially centrally of the outline. The switches and their respective tab-representing outlines 60 are suitably arranged in groups, such as groups 70 and 72, according to the keyboard or function controlled thereby. In the illustrated example, grouping 70 comprises the stops for rhythm selection, and grouping 72 comprises the stops for the pedal keyboard. Just as different colored tablets are conventionally employed to differentiate groups of tabs according to the keyboard or function controlled thereby, all of the tab-representing outines 60 in a particular grouping are printed in one color, and the "tabs" in other groupings are printed in other colors. For example, all of the "tab" outlines in grouping 70 may be blue in color, and the "tab" outlines in group 72, yellow. Paint of other colors, if sufficiently bright to be visible under ambient light conditions in spite of being applied over the grey background paint, may be used to distinguish other groupings. The names 62 of the stop tabs, and the names of the various categories of effects and box lines, are all preferably displayed in silver for aesthetic reasons and clear visibility. In addition to tab and group names, the logo of the manufacturer, the name and number of the organ model, labels for the slide controls and power switch, etc., may be applied to the rear face of the panel in the same way. Thus, the inconvenience and cost of providing separate nameplates, escutcheons, etc., normally found on conventional stop control panels is eliminated.

Following application of the described graphics, opaque black paint is applied thereover, except for small circular areas, indicated by the dotted line circles 74, which are in register with the LED-receiving apertures 53 and 58 in switch assembly 14. The painted back surface is then coated with an adhesive for securing it to the front surface of the switch assemblies. Thus, the front surface of the panel, including the areas circumscribed by outlines 60 (except for circular areas) is opaque black, while the circular areas are only "light black" because they are covered with only transluscent grey paint; however, because of the sandwiched construction, little or no light is reflected from the circular areas 74 with the consequence that when the LED's are off, the whole area (except for the graphics) appears black, or "dead", and nothing behind the graphics sheet is visible from the front. However, when an LED is illuminated, in response to slight depression of the surface layer in the region of the lower end of a tab-representing outline 60, it appears to pop out from nowhere and is clearly visible to the observer and indicates the "on" condition of the stop with an illuminated spot (preferably red) disposed centrally within the associated outline.

The sandwiched construction protects the painted back surface of sheet 16 from abrasion and reactive chemicals, and since the front face of the sheet has nothing applied thereto, the panel is very durable and not subject to wear. The latching circuits are suitably of the configuration described in U.S. Pat. No. 4,023,457 and are so connected to respective switch pairs that closure of the lower switch of the pair turns "on" the associated stop and illuminates the associated indicator lamp, and closure of the upper switch of the pair turns the stop "off" and extinguishes the indicating lamp. Thus, the physical action of turning stops on and off is very similar to that involved in the actuation of conventional stop tablets, and provision of tab names within the tab-representing outlines, groups of which are distinguished from each other by color, also makes the tab selection process comfortably familiar. The departure from traditional stop tablets is much less than in the U.S. Pat. No. 4,023,457 system in which the "on" "off" switches for a given stop are physically separated by a considerable amount with only their vertical alignment suggesting that they are associated with the same stop; thus, tab selection requires more deliberate thought and action than is required with the present stop control panel.

While the switches associated with particular organ stops have been described and illustrated as pertaining to a representative small number of groups for particular manuals or functions, the modular construction of the support panel 12 and the switch assemblies permits the stops of an organ to be organized in other groupings, or in a lesser or greater number of groupings, as desired, simply by altering some wiring connections and the graphics applied to the common surface layer 16. Assuming, for example, that the stop control panel of FIG. 1 is intended for use with a relatively sophisticated organ, it can be adapted for use with a less sophisticated organ system simply by providing a surface layer having different graphics appropriate to the functions to be controlled, and possibly eliminating some of the modular switch assemblies. For instance, such less-sophisticated, and concomitantly lower-cost organ, may not contain the PEDAL feature; thus, the graphics would not include tab-representing outlines for the underlying four switch pairs required for control of these functions and the four switch pairs simply would not be connected to respective latching circuits. If the four tabs directly below the "PEDAL" tabs should also be dispensed with in the less sophisticated model, the modular switch assembly carrying the associated eight pairs of switches (four pairs in each of the upper and lower rows) could be dispensed with and replaced with a filler having the thickness of the membrane switch assembly. Alternatively, the switch assembly associated with the deleted tabs could be retained and used with other tab outlines rearranged on the graphics panel to partially or completely fill the void left by removal of the eight tab-representing outlines. This is all possible by virtue of the repeating pattern of apertures 18 in support panel 23 and the cooperating pattern of apertures 58 and switch contact positions in the membrane switch modules.

Figure 2A:
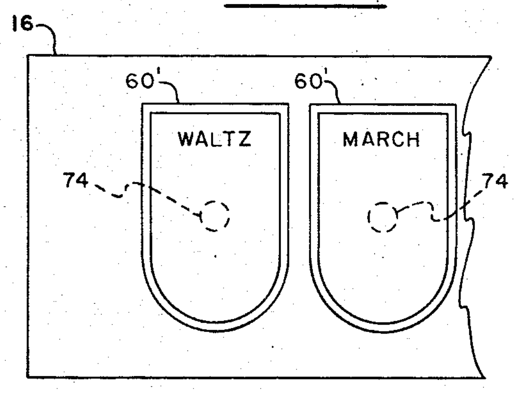
FIG. 2A is a fragmentary plan view showing an alternative configuration of the front surface of the FIG. 2 panel.

In the description thus far, the reasons for the apertures 18 in intermediate horizontal row 22 which, it will be recalled, it positioned substantially equidistantly from rows 20 and 24, has not been discussed. The apertures in this row are aligned with a plurality of apertures 53 formed in membrane switch 14 disposed in between the innermost contacts of the switch pairs of the top and bottom rows of switches. The spacing between the innermost contacts of the switch pairs of the top and bottom rows (e.g., contacts 52 and 54*a*) is typically $\frac{1}{4}$" larger than the spacing between the contacts of the switch pairs (e.g., contacts 50 and 52 or contacts 54*a* and 56*a*), thereby making it possible to scale up the size of the tab-representing outlines on the graphics panel without changing the construction of support panel 12 or switch assemblies 14. This gives the panel construction the added flexibility of using only a single row of tab-representing outlines, instead of the two shown in FIG. 1, simply by changing the graphics on common surface layer 16. In this case, the stop tab outlines are scaled up in both length and width to have essentially the same shape as outlines 60, and are centered between the top and bottom edges of the panel, as illustrated in FIG. 2A. The increased width of the outlines 60' is accommodated by skipping a vertical column of switch contacts between adjacent tab outlines. With this modification of the graphics, light-emitting diodes supported in apertures 18 and 53 in the intermediate row are centrally positioned within the tab outlines 60', as shown at 74 in FIG. 2A, in between and spaced substantially equidistantly from switch contact 52 in the lower of the upper two rows of switch contacts and contact 54a in the uppermost of the two lower horizontal rows of switch contacts. The tab-representing outlines 60' are sufficiently long to circumscribe these contacts, which are connected to an associated latching circuit in a manner such that depression of contact 54a turns "on" the stop associated with the particular tab and energizes the indicating lamp, and depression of contact 52 turns the stop "off" and extinguishes the indicating lamp. In this case, contacts 50 in the uppermost horizontal row and contacts 56a in the lowermost horizontal row are not connected to latching circuitry, but may be used, if desired, to control other functions related to the particular organ voice associated with the "tab". In any case, the savings in manufacturing cost realized from the use of the universal support panel 12 and modular switch assemblies 14 far outweighs the cost of providing unused switch contacts.

The advantage of the described panel construction that only the graphics on the front cover sheet 16 need to changed to accommodate the panel to different organ models also extends to changes in the aesthetic appearance of the panel. For example, should it be desired to change the shape and/or general appearance of the tab-representing outlines, this can readily be accomplished simply by changing the graphics. One alternative form of outline, shown in FIG. 2B, has a rectangular outer perimeter 80 and an inner perimeter 82 of a shape generally corresponding to the shape of a conventional stop tablet, that is, with the upper end squared off and the lower end rounded. The outline is printed in a distinguishing color, and the area 84 within the outline is the same opaque color as the background area 86 of the panel, for example black or dark brown. The name 88 of the stop is applied near the upper end of the opaque circumscribed area 84, preferably in white or silver.

Figure 2B:
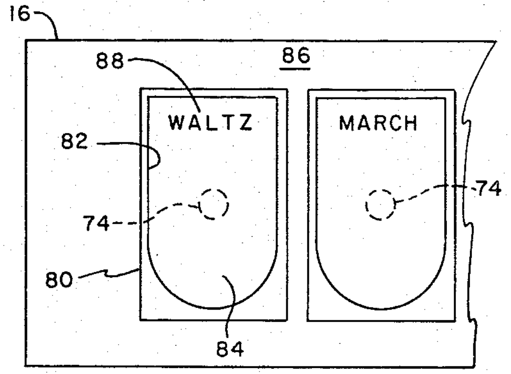
FIG. 2B is a fragmentary plan view of a portion of an organ stop control panel illustrating an alternate shape of the "tab" outline.
Figure 2C:
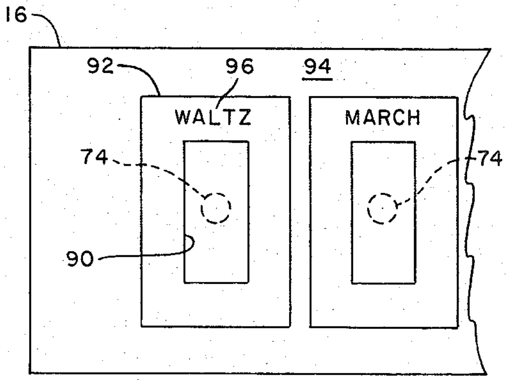
FIG. 2C is a fragmentary plan view of a portion of an organ stop control panel illustrating still another alternate shape of "tab" outline.

Another alternative outline shape, simulative of the rocker tablets used on some organs for stop control, is illustrated in FIG. 2C. In this case, the outline, printed in a color that contrasts with the background (typically black or dark brown) is significantly wider than in the earlier-described emobidments and is defined by a small rectangle 90 within a larger rectangle 92. The area within rectangle 90 is the same color as the background 94, the name 96 of the tab is printed in white or silver on the outline color, and the transluscent area 74 through which an energized LED is visible is disposed centrally of the inner rectangle.

It will be understood that each of the alternative outline shapes shown in FIGS. 2B and 2C may be sized to allow either two horizontal rows of outlines as shown in FIG. 1 or one row as shown in FIG. 2A.

While a preferred embodiment of the invention has been shown and described, it will be apparent to those skilled in the art that other changes and modifications may be made without departing from the invention in its broader aspects. Therefore, the appended claims are intended to cover all such changes and modifications as fall within the true spirit and scope of the invention.

We claim:

1. A control panel for mounting on the console of an organ having a plurality of latching circuits associated respectively with individual organ stops and adapted to energize circuitry for affecting the tonal quality of the organ in accordance with the latching circuit state, said control panel comprising:

a flat, elongated support panel having a multiplicity of apertures therethrough arranged in at least first and second vertically spaced horizontal rows and a plurality of horizontally spaced vertical columns, a plurality of touch-sensitive switches supported on said support panel, at least some of which are arranged in pairs connected for setting and re-setting, respectively, a corresponding latching circuit, the switches of each pair being disposed proximate and respectively below and above an aperture in said support panel, indicating lamps responsive to respective conditions of each of said latching circuits for indicating the state of each latching circuit and corresponding organ stop, an indicating lamp responsive to a given latching circuit being disposed in an aperture in said support panel disposed between the pair of touch-sensitive switches employed for operating the given latching circuit, and a common surface layer overlaying said touch-sensitive switches and said indicating lamps providing a substantially flat overall front surface for the panel through which said switches are operable by touch of said layer and through which said indicating lamps are observable only when energized, said surface layer having displayed thereon a plurality of outlines each positioned to circumscribe a different pair of said switches and the indicating lamp associated therewith.

2. A control panel according to claim 1, wherein said surface layer is essentially opaque to ambient light.

3. A control panel according to claim 1 or claim 2, wherein said touch-sensitive switches and corresponding outlines are disposed in groups according to organ functions controlled by said organ stops.

4. A control panel according to claim 3, wherein the outlines of a group are distinguished by color from outlines of other groups.

5. A control panel according to claim 4, wherein said surface layer has displayed thereon within each outline the name of the organ function controlled by the underlying pair of switches.

6. A control panel according to claim 5, wherein the name of the organ function is displayed on the area circumscribed by the outline in a color contrasting with the color of the surface layer.

7. A control panel according to claim 5, wherein the name of the organ function is displayed on the outline color in a color contrasting with the outline color.

8. A control panel according to claim 6, wherein each of said outlines has generally the shape of an elongated rectangle and is disposed on said panel with its length dimension oriented vertically.

9. A control panel according to claim 8, wherein each of said outlines is squared off at its upper end and rounded at its lower end to give the appearance of a traditional organ stop tablet.

10. A control panel according to claim 8, wherein each of said outlines has an outer perimeter defined by an elongated rectangle and an inner perimeter defined by a smaller elongated rectangle rounded at its lower end.

11. A control panel according to claim 7, wherein each of said outlines has an outer perimeter defined by a first elongated rectangle disposed on said panel with its length dimension oriented vertically and an inner perimeter defined by a second proportionally smaller rectangle disposed centrally of said first rectangle.

12. A control panel according to claim 1, wherein said outlines are arranged in first and second vertically spaced horizontal rows, and wherein said indicating lamps are supported in apertures, contained in said first and second horizontal rows.

13. A control panel according to claim 1, wherein some of the multiplicity of apertures through said support panel are arranged in a third horizontal row, intermediate said first and second rows of apertures, wherein said outlines are arranged in a single horizontal row, and wherein said indicating lamps are disposed in apertures in said third horizontal row.

14. A control panel according to claim 13, wherein said third row of apertures is substantially equally spaced from said first and second rows of apertures.

15. A control panel according to claim 1, wherein the apertures in said support panel are arranged in a continuously repetitive pattern over a substantial portion of the length of said support panel, and said touch-sensitive switches are arranged in modular groups in patterns corresponding to the repetitive aperture patterns so as to permit selective positioning of groups of switches over desired longitudinal portions of said repetitive aperture pattern, and wherein said surface layer has outlines displayed thereon only at locations to circumscribe switch pairs included in the selected groups of switches desired to be operable to control individual stops of the associated organ.

16. A control panel according to claim 13, wherein said third row of apertures is substantially equally spaced from said first and second rows of apertures, wherein the apertures in said support panel are arranged in a continuously repetitive pattern over a substantial portion of the length of said support panel, wherein said touch-sensitive switches are arranged in modular groups in patterns corresponding to the repetitive pattern of apertures of said first and second rows so as to permit selective positioning of groups of switch pairs over desired longitudinal portions of said repetitive aperture pattern, wherein the spacing between the innermost switch of two pairs of switches in a column is greater than the spacing between the switches of a pair, wherein said surface layer has outlines displayed thereon only at locations to circumscribe the innermost switch of two pairs of switches of a column included in the selected groups of switches desired to be operable to control individual stops of the associated organ, and wherein indicating lamps are disposed in apertures in said third row of apertures between the innermost switches of pairs of switches of said selected groups.

17. A control panel according to claim 1 or claim 13 or claim 16, wherein said indicating lamps are light-emitting diodes.

18. A control panel according to claim 1 or claim 13, wherein said support panel is the front surface of a flat, elongated aluminum extrusion.

19. A control panel according to claim 18, wherein said aluminum extrusion has integral bosses on the back surface thereof for mounting printed circuit strips for supporting and aligning said indicator lamps with selected apertures in said support panel.

* * * * *